ENVELOPE DETECTOR FOR SINUSOIDAL PULSE TRAINS

Filed Oct. 12, 1959

INVENTORS
WATSON F. WALKER
JOHN A. NUGENT
BY
T. L. Staynes
ATTORNEY

United States Patent Office 2,988,704
Patented June 13, 1961

2,988,704

ENVELOPE DETECTOR FOR SINUSOIDAL PULSE TRAINS

Watson F. Walker, Pittsford, and John A. Nugent, Rochester, N.Y., assignors to General Dynamics Corporation, Rochester, N.Y., a corporation of Delaware Filed Oct. 12, 1959, Ser. No. 846,028
10 Claims. (Cl. 329—102)

The present invention relates generally to a new and improved detector for a modulated pulse train and is more particularly concerned with improvements in such a detector to avoid phase shifts which have characterized prior detecting circuits of this general type.

The detector of the present invention is particularly well suited for use as a coincidence decoder in TACAN equipment of the type described on pages 521 to 557 of the book "Electronic Avigation Engineering" by Peter C. Sandretto (published in 1958 by International Telephone and Telegraph Corporation). However, as will become evident from the ensuing description, this detector may also be used to demodulate other pulse trains and, hence, the invention is not limited to use in a TACAN system. The invention is concerned with improvements in detector circuits of the type shown and described on page 549 of the above-identified book by Sandretto. As is there discussed, the conventional circuit for demodulating an amplitude modulated pulse train is known as a peak riding detector. Such a circuit, as will be described in more detail hereinafter, results in the introduction of phase shifts or time delays in the detected envelope or modulation component. The magnitude of this delay is a function of the spacing between the pulses in the train and it is often sufficient to introduce errors in the measuring devices or other apparatus to which the detected envelope is applied.

It is, therefore, the principal object of the present invention to provide a detector which has many of the characteristics of a peak riding circuit but which does not introduce undesirable phase shifts or time delays in the detected envelope.

Another object of the invention is to provide a detector for an amplitude modulated pulse train which detector develops an output envelope whose phase does not shift appreciably in response to variations in repetition rate of the pulses.

A further object of the invention is to provide a new and improved circuit for the detection of an amplitude modulated pulse train, the circuit being characterized by its ability to detect the modulation envelope without giving rise to undesired phase shifts.

The invention both as to its organization and method of operation, together with further objects and advantages thereof, will best be understood by reference to the specification, taken in connection with the accompanying drawing, in which.

Figure 1:
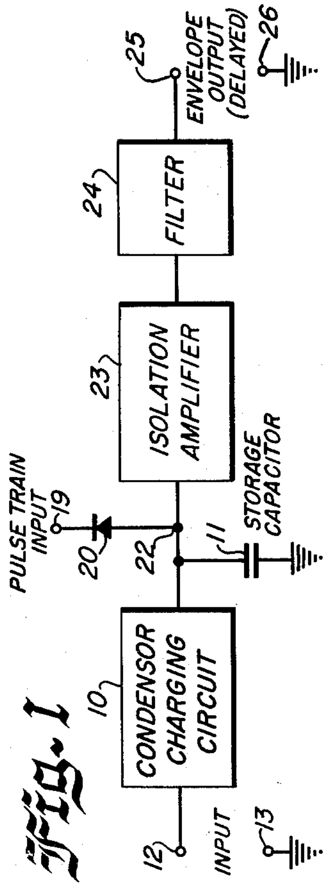
FIG. 1 is a block diagram representing the peak riding detector of the prior art.

Referring now to the drawing and first to FIG. 1, there is shown a peak riding detector of the type employed prior to the present invention. This detector includes a circuit 10 for controlling the charging and discharging of a storage capacitor 11. The input terminals 12 and 13 of the circuit 10 are supplied with an amplitude modulated train of pulses which may have the appearance of the waveform 15 shown in FIG. 3. The wave 15 is illustrated as being made up of a train of pulses 16*a*, 16*b*, etc. amplitude modulated by an envelope 17 which is to be detected. While the pulses 16 are shown as having a random distribution, this is not necessary to the present invention since these pulses may also be uniformly distributed. The circuit 10 is also supplied with a train 18 of clipped pulses indicated at 18*a*, 18*b*, etc. in FIG. 3. The latter pulses are supplied to terminal 19 of the circuit and are passed through a rectifier 20. The pulses 18*a*, 18*b*, etc. are respectively developed from the leading edges of the pulses 16*a*, 16*b*, etc. and, hence, the two pulse trains are related in time in the manner indicated in FIG. 3.

Figure 3:
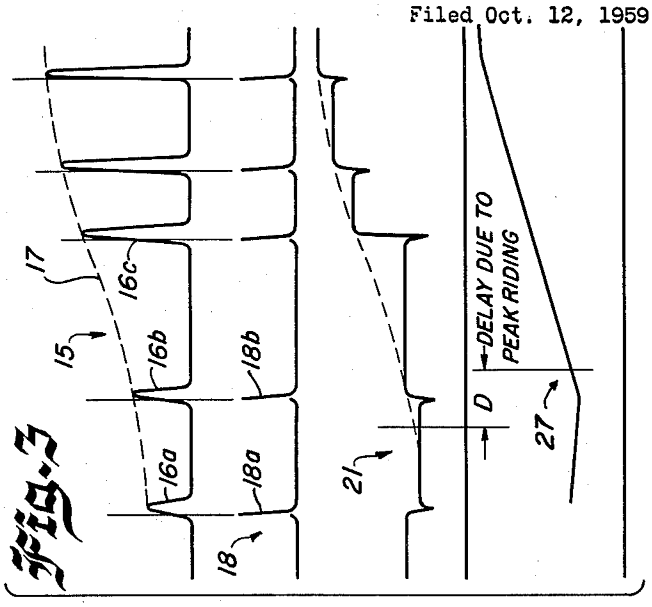
FIG. 3 shows a series of waveforms useful in explaining the operation of the prior art circuit shown in FIG. 1.

As will be well understood by those skilled in this art the storage capacitor 11 is discharged when one of the pulses of the train 18, for example, the pulse 18*a*, is applied to the circuit 10. To this end, the latter circuit preferably includes a vacuum tube or transistor which is rendered conductive when the pulse 18*a* arrives. The capacitor 11 then discharges through the conducting circuit until the voltage on its upper end reaches the level of the particular pulse 16*a* occurring in coincidence with the triggering pulse 18*a*. During the period between pulses the capacitor 11 remains charged to the latter value. The arrival of the succeeding pulse 18*b* again causes the capacitor 11 to discharge to a level governed by the amplitude of the pulse 16*b*. This operation continues in an obvious manner so that a wave of the form indicated at 21 in FIG. 3 is developed at the junction 22. The latter wave is passed through an isolation amplifier 23 and through a low pass filter circuit 24 designed to eliminate the pulse train and to pass the envelope frequency.

The output of the filter circuit 24 appears across terminals 25 and 26 and has the appearance of the wave 27 shown in FIG. 3. The wave 27 has the general appearance of the modulation envelope 17 of the input wave 15 but the wave 27 is obviously shifted or delayed by an amount indicated at D in FIG. 3. The delay results from the peak riding operation described and its magnitude is a function of the distribution or spacing between pulses. The slope of the wave 27 is very nearly the same as that of the envelope 17 due to the fact that the repetition rate of the pulses 16*a*, 16*b*, etc. is very high in comparison with the frequency of the modulation envelope.

Figure 2:
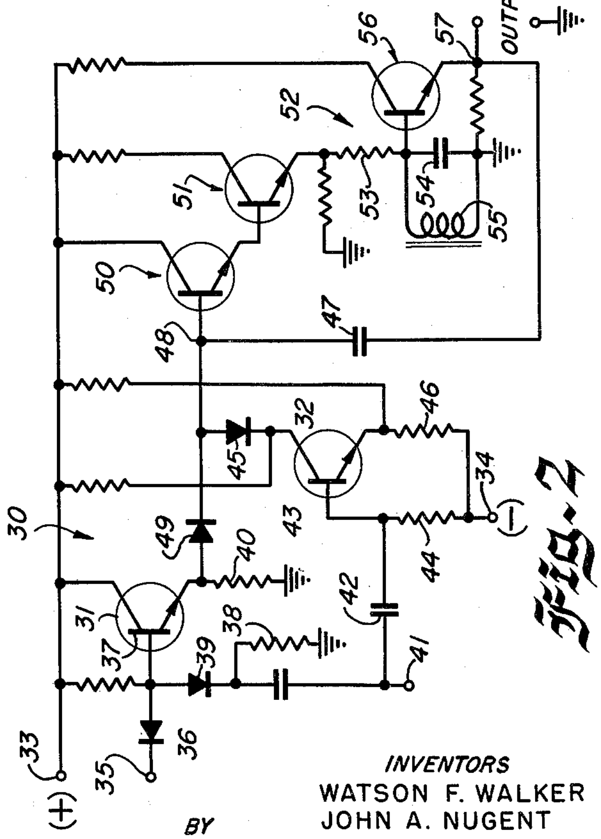
FIG. 2 is a schematic diagram illustrating the detector of the present invention.

Turning now to the detector of the present invention shown in FIG. 2, it will be observed that this detector includes a condenser charging and discharging circuit indicated generally by the reference numeral 30. The circuit 30 includes a pair of transistors 31 and 32 which are excited with the usual D.C. voltages supplied via terminals 33 and 34. A wave like that indicated at 15 in FIG. 3 is supplied to an input terminal 35 and through a rectifier 36 to the base 37 of the transistor. The input signal to the transistor base is developed across resistor 38 connected to a diode 39. The transistor 31 functions in conventional manner to amplify the input signal and to develop an output across a load resistor 40 connected in the emitter circuit.

A pulse train like that indicated at 18 in FIG. 3 is supplied to an input terminal 41 and is passed through a coupling condenser 42 to the base circuit of the transistor 32. The input signal to the base 43 of the transistor is developed across a load resistor 44 connected between the base and the negative D.C. terminal 34. When one of the pulses in the train 18, for example, the pulse 18*a*, is applied to the base of the transistor 32, the latter conducts thus forming a discharge path for a storage capacitor 47 through a diode 45 and through a resistor 46. The voltage at the junction 48 in the circuit thus falls until it reaches the level of the pulse 16a appearing across resistor 40. At this point a diode 49 acts as a clamp so that the voltage at the junction 48 follows the pulse 16a up to its peak value. After the passing of the pulses 18a and 16a diodes 45 and 49 are non-conducting and, hence, the upper end of the capacitor 47, i.e., junction point 48, remains at the peak level of the pulse 16a.

Figure 4:
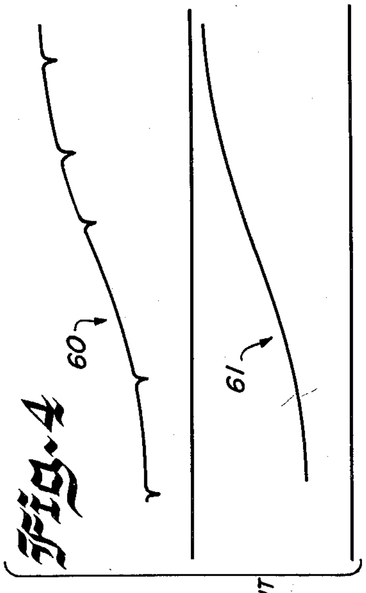
FIG. 4 shows a group of waveforms useful in explaining the operation of the circuit shown in FIG. 2.

The signal developed at the junction 48 is passed through transistor amplifiers 50 and 51 and through a low pass filter circuit 52 comprising resistor 53, condenser 54 and inductor 55. The filter circuit 52 removes the pulse frequency and passes the envelope frequency to a transistor amplifier 56. In accordance with an important feature of the present invention, a unity gain output terminal 57 of the amplifier 56 is connected to the underside of the storage capacitor 47, thereby to feed back a portion of the output envelope to the storage capacitor. Thus, during the interval between successive pulses, i.e., 18a and 18b, the voltage at the junction point 48 starts at the peak value of the pulse 16a and changes gradually in accordance with the output envelope, thus producing at the junction 48 a signal having the appearance of the wave 60 shown in FIG. 4. The pulses shown in the latter wave coincide with those in the input train and are, of course, eliminated by the filter 52. Thus, the output appearing at terminal 57 in the circuit is of the form indicated at 61 in FIG. 4 and is very close to the modulation envelope 17.

In effect the feedback signal supplied from terminal 57 to the storage capacitor 47 causes the signal at junction 48 to anticipate the level of the next pulse (i.e., pulse 16b). This avoids the sharp steps present in the output signal from the normal peak riding detector (as indicated at 21 in FIG. 3), and, hence, smoothes out the input signal to the filter 52. The action is cumulative since the smoother input signal to the filter results in an improved signal at terminal 57 and, hence, yields a more accurate prediction of the succeeding pulse amplitude by the storage capacitor 47. Since the input wave to the amplifiers 50 and 51 closely approximates the true envelope 17, the output appearing at terminal 57 is no longer shifted in phase as a result of the spacing between the pulses. The signal fed back to the storage capacitor 47 must, of course, be coordinated in amplitude with the rise in the modulation envelope to enable an accurate prediction. To this end, the feedback is derived from a unity gain output terminal of the amplifier 56. If necessary, a voltage divider may be employed in the output to feed back a signal having unity gain through the filter 52 and the amplifiers 50, 51 and 56.

In view of the foregoing description, it will be recognized that the detector of the present invention avoids the phase shifts or time delays which characterized the peak riding detectors of the prior art. Moreover, the phase of the output signal is substantially unaffected by variations in pulse spacing or distribution.

While particular embodiments of the invention have been shown and described, it will be understood that many modifications will become readily apparent to those skilled in the art and it is, therefore, intended in the appended claims to cover any such modifications that fall within the true spirit and scope of the invention.

What is claimed as new and desired to be secured by Letters Patent of the United States is:

1. A detector for detecting the modulation envelope of an amplitude modulated pulse train, said detector comprising a control circuit excited by the amplitude modulated pulse train, a storage capacitor having one plate connected to said control circuit and charged thereby, said control circuit including means for varying the charge on said capacitor in response to each of the pulses in said train in such manner that during each pulse the capacitor means becomes charged to a value which is a function of the peak value of that pulse, an output network connected to said one plate of the storage capacitor and including a filter for passing signals having a frequency corresponding to the modulation component of the input train while rejecting signals having a frequency corresponding to the repetition rate of the pulses of the input train, and a feedback circuit connected between the output network and the other plate of the storage capacitor for feeding back a signal corresponding to that passed by the filter so that during the period between pulses of the input train the charge on said one plate varies in accordance with the feedback signal.

2. The detector set forth in claim 1 wherein the signal fed back to the storage capacitor is derived from a unity gain terminal of the output network.

3. A detector for detecting the modulation envelope of an amplitude modulated pulse train, said detector comprising a control circuit excited by the amplitude modulated pulse train, storage capacitor means connected to said control circuit and charged thereby, said control circuit including means for varying the charge on said storage capacitor means in response to each of the pulses in said train in such manner that during each pulse the capacitor means becomes charged to a value which is a function of the peak value of that pulse, an output network connected to the storage capacitor means and including a filter for passing signals having a frequency corresponding to the modulation component of the input train while rejecting signals having a frequency corresponding to the repetition rate of the pulses in the input train, and a feedback circuit connected between the output network and the storage capacitor means for feeding back a signal corresponding to the signal passed by the filter so that during the period between pulses of the input train the signal supplied to the output network varies in accordance with the feedback signal.

4. The detector set forth in claim 3 wherein the signal fed back to the storage capacitor means is derived from a unity gain terminal of the output network.

5. A detector for detecting the modulation envelope of an amplitude modulated pulse train, said detector comprising a control circuit including storage capacitor means and excited by the amplitude modulated pulse train, said control circuit including means for varying the charge on said capacitor in response to each of the pulses in said train in such manner that during each pulse the capacitor becomes charged to a value which is a function of the peak value of that pulse, an output network connected to the control circuit and a feedback circuit connected between the output network and the control circuit for feeding back a signal derived solely from the modulation component of the input pulse train so that during the period between pulses of the input train the signal supplied to the output network from the control circuit varies in accordance with the feedback signal.

6. The detector set forth in claim 5 wherein the signal fed back to the control circuit is derived from a unity gain terminal of the output network.

7. A detector for detecting the modulation envelope of an amplitude modulated pulse train, said detector comprising a control circuit including a storage capacitor and excited by the amplitude modulated pulse train, said control circuit including means for varying the charge on said capacitor in response to each of the pulses in said train in such manner that during each pulse the capacitor becomes charged to a value which is a function of the peak value of that pulse, an output network connected to one plate of the storage capacitor, and a feedback circuit connected between the output network and the other plate of the storage capacitor for feeding back a signal corresponding to the modulation component of the input pulse train so that during the period between pulses of the input train the signal supplied to the output network from said one plate of the capacitor varies in accordance with the feedback signal.

8. The detector set forth in claim 7 wherein the signal fed back to said other plate of the storage capacitor is derived from a unity gain terminal of the output network.

9. A detector for detecting the modulation envelope of an amplitude modulated pulse train, said detector comprising a control circuit including storage capacitor means and excited by the amplitude modulated pulse train, said control circuit including means for varying the charge on said storage capacitor means in response to each of the pulses in said train in such manner that during each pulse the storage capacitor means becomes charged to a value which is a function of the peak value of that pulse, an output network connected to the control circuit and including a filter for passing signals having a frequency corresponding to the modulation component of the input train while rejecting signals having a frequency corresponding to the repitition rate of the pulses of the input train, and a feedback circuit connected between the output network and the control circuit for feeding back a signal corresponding to that passed by the filter so that during the period between pulses of the input train the signal supplied to the output network from the control circuit varies in accordance with the feedback signal.

10. The detector set forth in claim 9 wherein the signal fed back to the control circuit is derived from a unity gain terminal of the output network.

References Cited in the file of this patent

UNITED STATES PATENTS 2,790,903 Kirkness et al. ............ Apr. 30, 1957